United States Patent
Harrison

(10) Patent No.: US 11,852,746 B2
(45) Date of Patent: Dec. 26, 2023

(54) MULTI-SENSOR FUSION PLATFORM FOR BOOTSTRAPPING THE TRAINING OF A BEAM STEERING RADAR

(71) Applicant: Metawave Corporation, Carlsbad, CA (US)

(72) Inventor: Matthew Paul Harrison, Palo Alto, CA (US)

(73) Assignee: Metawave Corporation, Carlsbad, CA (US)

(*) Notice: Subject to any disclaimer, the term of this patent is extended or adjusted under 35 U.S.C. 154(b) by 267 days.

(21) Appl. No.: 17/112,955

(22) Filed: Dec. 4, 2020

(65) Prior Publication Data

US 2021/0103027 A1    Apr. 8, 2021

Related U.S. Application Data

(60) Provisional application No. 62/911,549, filed on Oct. 7, 2019.

(51) Int. Cl.
| | | |
|---|---|---|
| *G01S 7/40* | (2006.01) | |
| *G01S 7/41* | (2006.01) | |
| *G01S 13/42* | (2006.01) | |
| *G01S 13/86* | (2006.01) | |
| *G01S 13/931* | (2020.01) | |
| *G01S 13/00* | (2006.01) | |

(52) U.S. Cl.
CPC ............... *G01S 7/40* (2013.01); *G01S 7/417* (2013.01); *G01S 13/426* (2013.01); *G01S 13/865* (2013.01); *G01S 13/867* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 9,977,430 | B2* | 5/2018 | Shalev-Shwartz ... | G05D 1/0088 |
| 10,019,011 | B1* | 7/2018 | Green ................. | G05D 1/0088 |
| 10,061,316 | B2* | 8/2018 | Nishi .................. | G06N 3/006 |
| 2018/0024239 | A1* | 1/2018 | Branson ............... | G01S 13/52 |
| | | | | 701/23 |
| 2018/0024569 | A1* | 1/2018 | Branson ............... | G01S 13/06 |
| | | | | 701/23 |

(Continued)

OTHER PUBLICATIONS

Entry for the word, "Bootstrapping"; "American Heritage Dictionary of the English Language"; fifth edition; copyright 2016; Houghton Mifflin Harcourt Publishing Co; Boston, MA, USA; retrieved from thefreedictionary.com on Oct. 31, 2022. (Year: 2016).*

(Continued)

*Primary Examiner* — Bernarr E Gregory

(57) ABSTRACT

Examples disclosed herein relate to a multi-sensor fusion platform for use in autonomous vehicles, the multi-sensor fusion platform including a camera perception engine having a camera neural network to detect and identify objects in camera data, a lidar perception engine having a lidar neural network to detect and identify objects in lidar data, and a radar perception engine having a radar neural network to detect and identify objects in radar data, such that training of the radar neural network is bootstrapped with the camera and lidar neural networks.

20 Claims, 15 Drawing Sheets

(56) References Cited

U.S. PATENT DOCUMENTS

2018/0067488 A1* 3/2018 Pollach .................. G06N 20/00
2018/0068206 A1* 3/2018 Pollach .................. G06V 20/58
2018/0074506 A1* 3/2018 Branson ............... G05D 1/0088

OTHER PUBLICATIONS

Entry for the word, "Bootstrapping" Wikipedia.org; retrieved on Oct. 31, 2022. (Year: 2022).*

* cited by examiner

MULTI-SENSOR FUSION PLATFORM FOR BOOTSTRAPPING THE TRAINING OF A BEAM STEERING RADAR

CROSS-REFERENCE TO RELATED APPLICATIONS

This application claims the benefit of U.S. Provisional Application No. 62/911,549 filed on Oct. 7, 2019, which is incorporated by reference in its entirety for all purposes.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All this while ensuring accuracy, consistency and cost optimization.

An aspect of making this work is the ability to detect and classify objects in the surrounding environment at the same or possibly at an even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

A multi-sensor fusion platform for bootstrapping the training of a beam steering radar is disclosed. The beam steering radar generates narrow, directed beams that can be steered to any angle (i.e., from 0° to 360°) across a Field of View ("FoV") to detect and identify objects in its path and surrounding environment in all-weather conditions and beyond line-of-sight. In various examples, the beam steering radar is used in an autonomous vehicle equipped with multiple sensors (e.g., camera, lidar, etc.) and a multi-sensor fusion platform for better control of driving functions and a safer driving experience. Each sensor may be used to detect and identify objects with perception engines implemented with neural networks (e.g., deep learning networks). As described in more detail herein below, the training of a radar perception engine is bootstrapped by the training of camera and lidar perception engines in the multi-sensor fusion platform. For example, each of the perception engines, including but not limited to, for example, a radar perception engine, a camera perception engine, or a lidar perception engine, may be implemented via an electronic system 1500 (as described below with respect to FIG. 15), which can be a computer, a server, or generally any electronic device that executes a program.

It is appreciated that the detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
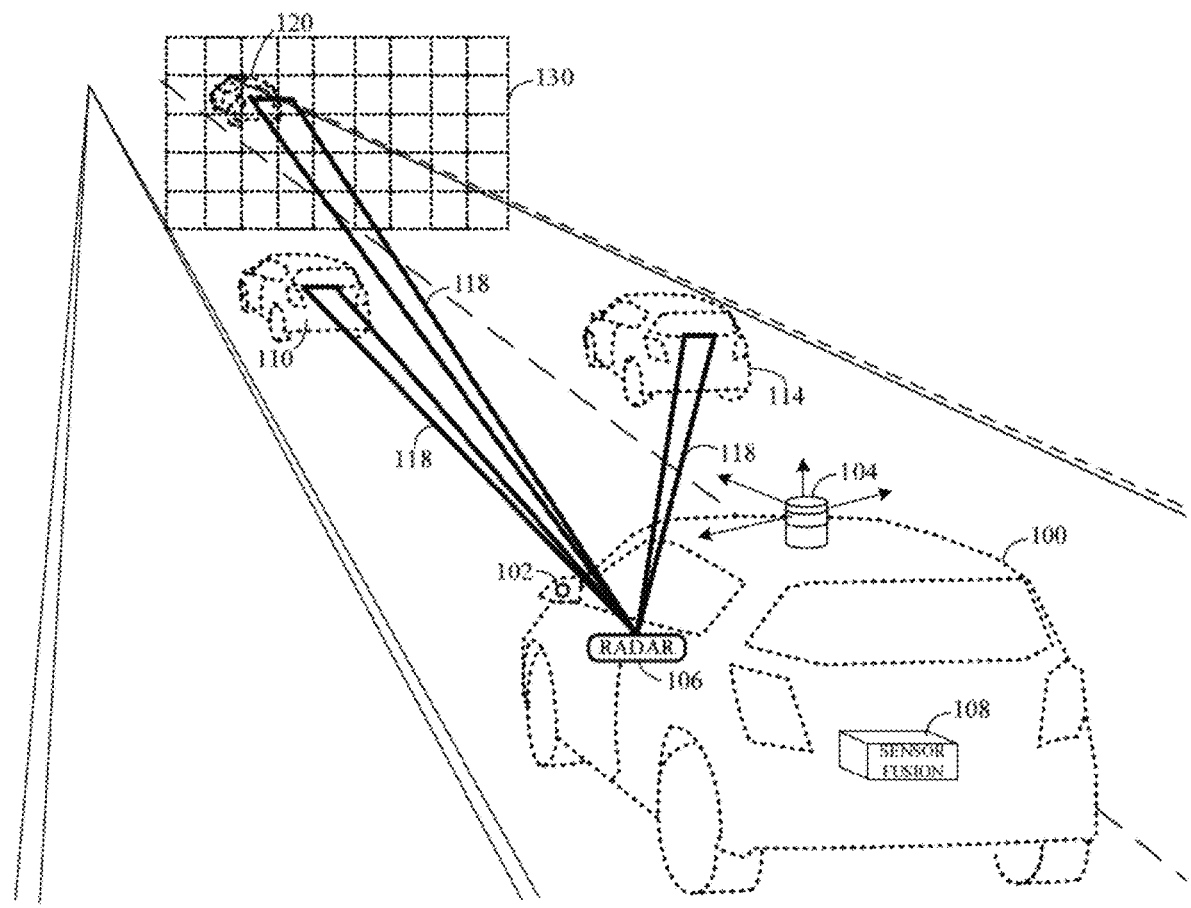
FIG. 1 illustrates an example environment in which a beam steering radar in an autonomous vehicle is used to detect and identify objects, according to various implementations of the subject technology.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100, however may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras can be used to capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a 360° true 3D vision and human-like interpretation of the path and surrounding environment of the ego vehicle 100. The beam steering radar 106 is capable of shaping and steering RF beams in all directions in a 360° FoV with at least one beam steering antenna and recognize objects quickly and with a high degree of accuracy over a long range of around 300 meters or more. The short-range capabilities of the camera 102 and the lidar 104 along with the long-range capabilities of the radar 106 enable a multi-sensor fusion module 108 in the ego vehicle 100 to enhance its object detection and identification.

As illustrated, the beam steering radar 106 can detect both vehicle 120 at a far range (e.g., greater than 350 m) as well as vehicles 110 and 114 at a short range (e.g., lesser than 100 m). Detecting both vehicles in a short amount of time and with enough range and velocity resolution is imperative for full autonomy of driving functions of the ego vehicle. The radar 106 has an adjustable Long-Range Radar ("LRR") mode that enables the detection of long range objects in a very short time to then focus on obtaining finer velocity resolution for the detected vehicles. Although not described herein, radar 106 is capable of time-alternatively reconfiguring between LRR and Short-Range Radar ("SRR") modes. The SRR mode enables a wide beam with lower gain. However, it can be configured to make quick decisions to avoid an accident, assist in parking and downtown travel, and capture information about a broad area of the environment. The LRR mode enables narrow, directed beams to reach long distances and at a high gain; this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Figure 2:
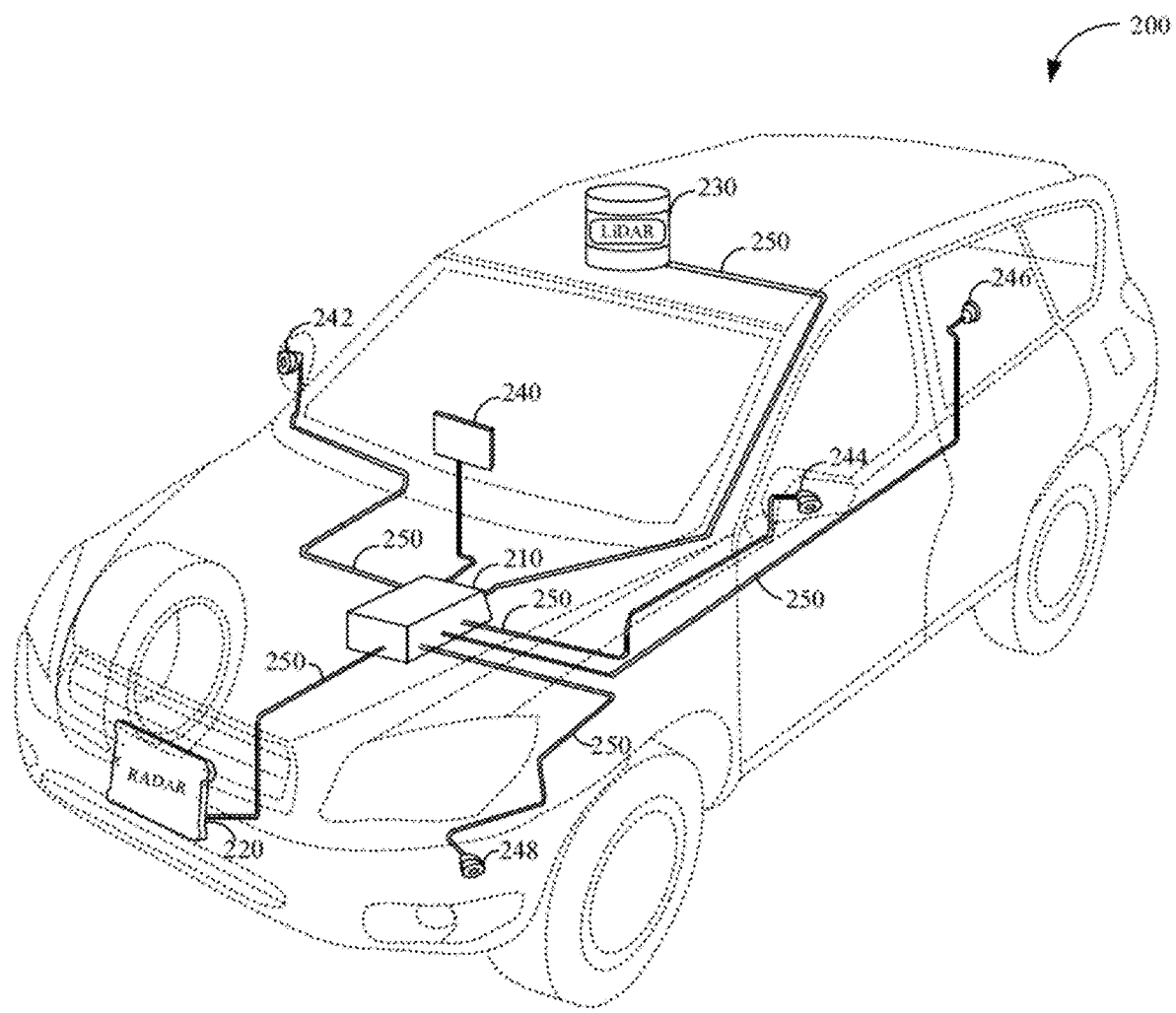
FIG. 2 illustrates an example network environment in which a radar system may be implemented in accordance with one or more implementations of the subject technology.

Attention is now directed to FIG. 2, which illustrates an example network environment 200 in which a radar system may be implemented in accordance with one or more implementations of the subject technology. The example network environment 200 includes a number of electronic devices 220, 230, 240, 242, 244, 246, and 248 that are coupled to an electronic device 210 via the transmission lines 250. The electronic device 210 may communicably couple the electronic devices 242, 244, 246, 248 to one another. In one or more implementations, one or more of the electronic devices 242, 244, 246, 248 are communicatively coupled directly to one another, such as without the support of the electronic device 210. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 210 may include a switch device, a routing device, a hub device, or generally any device that may communicably couple the electronic devices 220, 230, 240, 242, 244, 246, and 248.

In one or more implementations, at least a portion of the example network environment 200 is implemented within a vehicle, such as a passenger car. For example, the electronic devices 242, 244, 246, 248 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 2, the electronic device 210 is depicted as a central processing unit, the electronic device 220 is depicted as a radar system, the electronic device 230 is depicted as a lidar system having one or more lidar sensors, the electronic device 240 is depicted as an entertainment interface unit, and the electronic devices 242, 244, 246, 248 are depicted as camera devices, such as forward-view, rear-view and side-view cameras. In one or more implementations, the electronic device 210 and/or one or more of the electronic devices 242, 244, 246, 248 may be communicatively coupled to a public communication network, such as the Internet.

The electronic device 210 includes a multi-sensor fusion platform for processing data acquired by electronic devices 220, 230, 240, 242, 244, 246, and 248, including labeling objects detected and identified in the acquired data. Such objects may include structural elements in the environment near the vehicle such as roads, walls, buildings, road center medians and other objects, as well as other vehicles, pedestrians, bystanders, cyclists, plants, trees, animals and so on.

Figure 3:
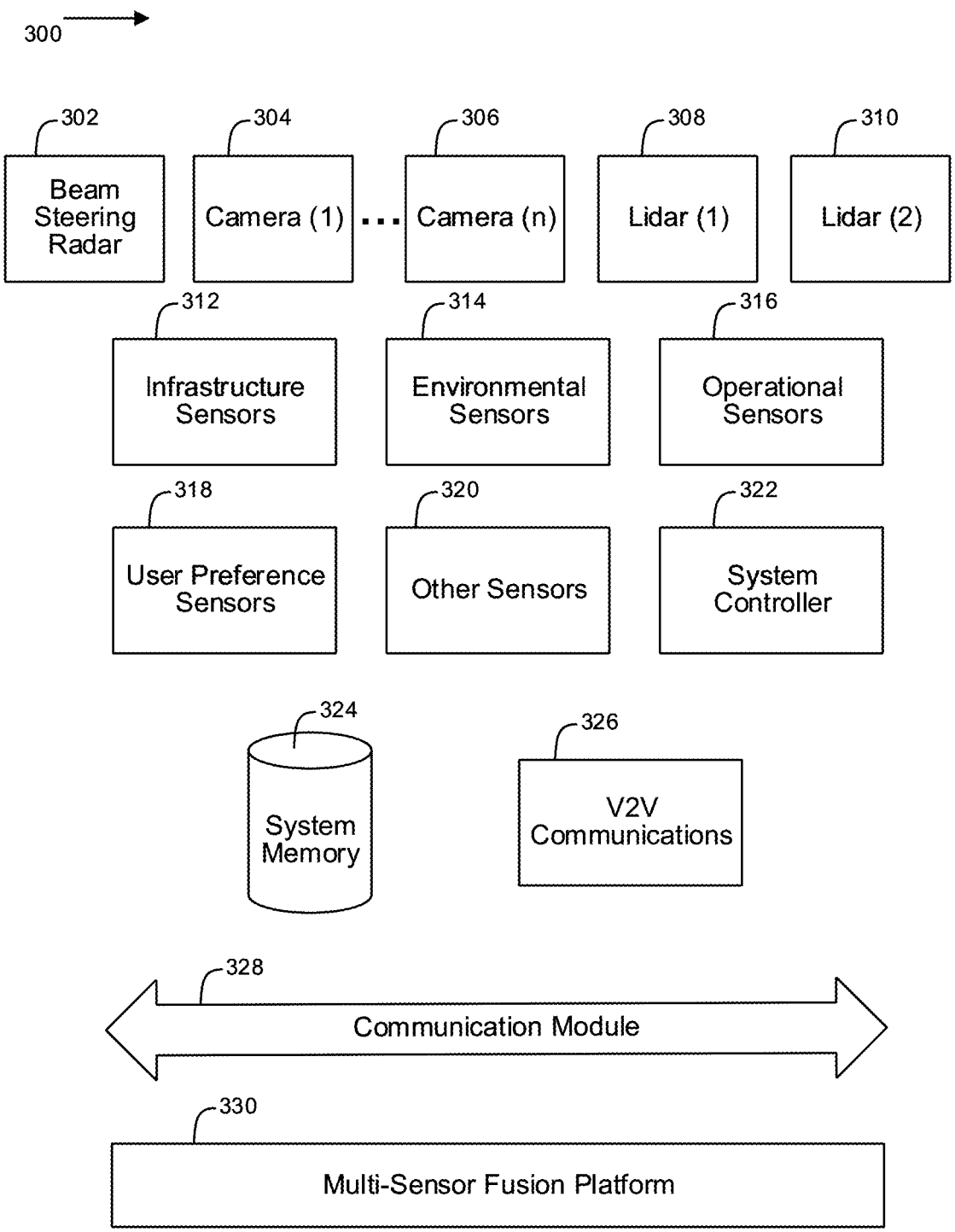
FIG. 3 illustrates a schematic diagram of an autonomous driving system for an ego vehicle in accordance with various implementations of the subject technology.

FIG. 3 illustrates a schematic diagram of an autonomous driving system 300 for an ego vehicle in accordance with various implementations of the subject technology. The autonomous driving system 300 is a system for use in an ego vehicle (e.g., ego vehicle 100 of FIG. 1) and that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 300 includes a beam steering radar system 302 and other sensor systems such as cameras 304-306, lidars 308-310, infrastructure sensors 312, environmental sensors 314, operational sensors 316, user preference sensors 318, and other sensors 320. The autonomous driving system 300 also includes a communications module 328, a multi-sensor fusion platform 330, a system controller 322, a system memory 324, and a Vehicle-to-Vehicle (V2V) communications module 326.

As illustrated, the autonomous driving system 300 has multiple camera sensors 304-306 positioned in different locations in the ego vehicle, such as cameras 242-248 of FIG. 2. The autonomous driving system 300 also has at least one lidar sensor to create a 360° 3D map of the environment represented as a point cloud. In various implementations, the system 300 has a lidar 308 that measures distances to objects detected and identified in the 3D map and a more sophisticated lidar 310 that is also able to measure the velocity of moving objects, such as a Frequency Modulated Continuous Wave ("FMCW") lidar.

In various examples, the beam steering radar 302 includes at least one beam steering antenna for providing dynamically controllable and steerable beams that can focus on one or multiple portions of a 360° FoV of the vehicle. The beams radiated from the beam steering antenna are reflected back from objects in the vehicle's path and surrounding environment and received and processed by a perception engine coupled to the beam steering radar 302 to detect and identify the objects and control the radar module as desired. As described in more detail below, the camera sensors 304-306 and lidars 308-310 are also coupled to perception engines having neural networks capable of detecting and identifying objects in the acquired data.

Infrastructure sensors 312 may provide information from infrastructure while driving, such as from a smart road configuration, bill board information, traffic alerts and indicators, including traffic lights, stop signs, traffic warnings, and so forth. Environmental sensors 314 detect various conditions outside, such as temperature, humidity, fog, visibility, precipitation, among others. Operational sensors 316 provide information about the functional operation of the vehicle. This may be tire pressure, fuel levels, brake wear, and so on. The user preference sensors 318 may detect conditions that are part of a user preference. This may be temperature adjustments, smart window shading, etc. Other sensors 320 may include additional sensors for monitoring conditions in and around the ego vehicle.

In various examples, the multi-sensor fusion platform 330 optimizes these various functions to provide an approximately comprehensive view of the ego vehicle and environments. Many types of sensors may be controlled by the multi-sensor fusion platform 330. These sensors may coordinate with each other to share information and consider the impact of one control action on another system. In one example, in a congested driving condition, a noise detection module (not shown) may identify that there are multiple radar signals that may interfere with the vehicle. This information may be used by the perception engine coupled to the beam steering radar 302 to adjust the scan parameters of the beam steering radar 302 to avoid these other signals and minimize interference.

In another example, environmental sensor 314 may detect that the weather is changing, and visibility is decreasing. In this situation, the multi-sensor fusion platform 330 may determine to configure the other sensors to improve the ability of the vehicle to navigate in these new conditions. The configuration may include turning off the cameras 304-306 and/or the lidars 308-310, or reducing the sampling rate of these visibility-based sensors. This effectively places reliance on the sensor(s) adapted for the current situation. In response, the perception engines configure the sensors for these conditions as well. For example, the beam steering radar 302 may reduce the beam width to provide a more focused beam, and thus a finer sensing capability.

In various examples, the multi-sensor fusion platform 330 may send a direct control to the radar 302 based on historical conditions and controls. The multi-sensor fusion platform 330 may also use some of the sensors within the autonomous driving system 300 to act as feedback or calibration for the other sensors. In this way, the operational sensors 316 may provide feedback to the multi-sensor fusion platform 330 to create templates, patterns and control scenarios. These are based on successful actions or may be based on poor results, where the multi-sensor fusion platform 330 learns from past actions.

Data from the sensors 302-320 may be combined in the multi-sensor fusion platform 330 to improve the target detection and identification performance of autonomous driving system 300. The multi-sensor fusion platform 330 may itself be controlled by the system controller 322, which may also interact with and control other modules and systems in the ego vehicle. For example, the system controller 322 may power on or off the different sensors 302-320 as desired, or provide instructions to the ego vehicle to stop upon identifying a driving hazard (e.g., deer, pedestrian, cyclist, or another vehicle suddenly appearing in the vehicle's path, flying debris, etc.)

All modules and systems in the autonomous driving system 300 communicate with each other through the communication module 328. The system memory 324 may store information and data (e.g., static and dynamic data) used for operation of the autonomous driving system 300 and the ego vehicle using the autonomous driving system 300. The V2V communications module 326 is used for communication with other vehicles, such as to obtain information from other vehicles that is non-transparent to the user, driver, or rider of the ego vehicle, and to help vehicles coordinate with one another to avoid any type of collision.

It is appreciated that this configuration of autonomous driving system 300 is an example configuration and not meant to be limiting to the specific structure illustrated in FIG. 3. Additional systems and modules not shown in FIG. 3 may be included in autonomous driving system 300.

Figure 4:
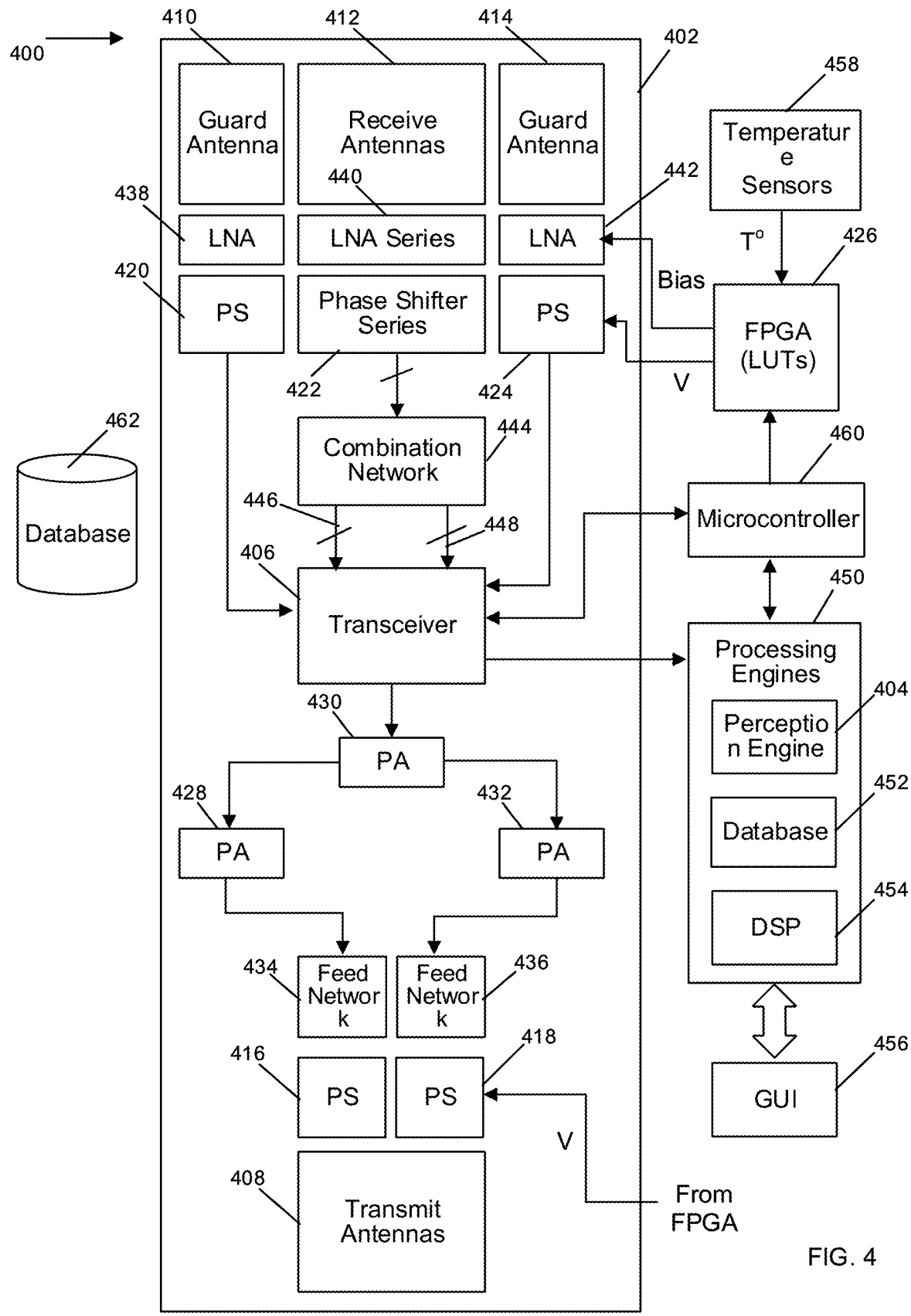
FIG. 4 is a schematic diagram of a beam steering radar system as in FIG. 3 in accordance with various examples.

FIG. 4 illustrates a schematic diagram of a beam steering radar system implemented as in FIG. 3 in accordance with various examples. Beam steering radar 400 is a "digital eye" with true 3D vision and capable of a human-like interpretation of the world. The "digital eye" and human-like interpretation capabilities are provided by two main modules: radar module 402 and a radar perception engine 404. Radar module 402 is capable of both transmitting RF signals within a FoV and receiving the reflections of the transmitted signals as they reflect off of objects in the FoV. With the use of analog beam steering in radar module 402, a single transmit and receive chain can be used effectively to form directional, as well as steerable, beams. A transceiver 406 in radar module 402 is adapted to generate signals for transmission through a series of transmit antennas 408 as well as manage signals received through a series of receive antennas 410-414. Beam steering within the FoV is implemented with phase shifter ("PS") circuits 416-418 coupled to the transmit antennas 408 on the transmit chain and PS circuits 420-424 coupled to the receive antennas 410-414 on the receive chain.

The use of PS circuits 416-418 and 420-424 enables separate control of the phase of each element in the transmit and receive antennas. Unlike early passive architectures, the beam is steerable not only to discrete angles but to any angle (i.e., from 0° to 360°) within the FoV using active beam steering antennas. A multiple element antenna can be used with an analog beam steering architecture where the individual antenna elements may be combined or divided at the port of the single transmit or receive chain without additional hardware components or individual digital processing for each antenna element. Further, the flexibility of multiple element antennas enables the generation of narrow beam widths for transmit and receive operation. The antenna beam widths decrease with an increase in the number of antenna elements. A narrow beam improves the directivity of the antenna and provides the radar 300 with a significantly longer detection range.

The major challenge with implementing analog beam steering is to design PSs to operate at 77 GHz. PS circuits 416-418 and 420-424 solve this problem with a reflective PS design implemented with a distributed varactor network currently built using GaAs materials. Each PS circuit 416-418 and 420-424 has a series of PSs, with each PS coupled to an antenna element to generate a phase shift value of anywhere from 0° to 360° for signals transmitted or received by the antenna element. The PS design is scalable in future implementations to SiGe and CMOS, bringing down the PS cost to meet specific demands of any customer application. Each PS circuit 416-418 and 420-424 is controlled by a Field Programmable Gate Array ("FPGA") 426, which provides a series of voltages to the PSs in each PS circuit that results in a series of phase shifts.

In various examples, a voltage value is applied to each PS in the PS circuits 416-418 and 420-424 to generate a given phase shift and provide beam steering. The voltages applied to the PSs in PS circuits 416-418 and 420-424 are stored in Look-up Tables ("LUTs") in the FPGA 426. These LUTs are generated by an antenna calibration process that determines which voltages to apply to each PS to generate a given phase shift under each operating condition. Note that the PSs in PS circuits 416-418 and 420-424 are capable of generating phase shifts at a very high resolution of less than one degree. This enhanced control over the phase allows the transmit and receive antennas in radar module 402 to steer beams with a very small step size, improving the capability of the radar 400 to resolve closely located targets at small angular resolution.

In various examples, the transmit antennas 408 and the receive antennas 410-414 may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the antennas 408-414 may be used to implement specific designs and meet specific constraints.

The transmit chain in radar 400 starts with the transceiver 406 generating RF signals to prepare for transmission over-the-air by the transmit antennas 408. The RF signals may be, for example, FMCW signals. An FMCW signal enables the radar 400 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 406, they are provided to power amplifiers ("PAs") 428-432. Signal amplification is needed for the FMCW signals to reach the long ranges desired for object detection, as the signals attenuate as they radiate by the transmit antennas 408. From the PAs 428-432, the signals are divided and distributed through feed networks 434-436, which form a power divider system to divide an input signal into multiple signals, one for each element of the transmit antennas 408. The feed networks 434-436 may divide the signals so power is equally distributed among them, or alternatively, so power is distributed according to another scheme, in which the divided signals do not all receive the same power. Each signal from the feed networks 434-436 is input into a PS in PS circuits 416-418, where they are phase shifted based on voltages generated by the FPGA 426 under the direction of microcontroller 460 and then transmitted through transmit antennas 408.

Microcontroller 460 determines which phase shifts to apply to the PSs in PS circuits 416-418 according to a desired scanning mode based on road and environmental scenarios. Microcontroller 460 also determines the scan parameters for the transceiver 406 to apply at its next scan. The scan parameters may be determined at the direction of one of the processing engines 450, such as at the direction of radar perception engine 404. Depending on the objects detected, the perception engine 404 may instruct the microcontroller 460 to adjust the scan parameters at a next scan to focus on a given area of the FoV or to steer the beams to a different direction.

In various examples and as described in more detail below, radar 400 operates in one of various modes, including a full scanning mode and a selective scanning mode, among others. In a full scanning mode, both transmit antennas 408 and receive antennas 410-414 scan a complete FoV with small incremental steps. Even though the FoV may be limited by system parameters due to increased side lobes as a function of the steering angle, radar 400 is able to detect objects over a significant area for a long range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate), however is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, radar 400 scans around an area of interest by steering to a desired angle and then scanning around that angle. This ensures the radar 400 is to detect objects in the area of interest without wasting any processing or scanning cycles illuminating areas with no valid objects. One of the scenarios in which such scanning is useful is in the case of a curved freeway or road. Since the radar 400 is capable of detecting objects at a long distance, e.g., 300 m or more at boresight, if there is a curve in a road, direct measures do not provide helpful information. Rather, the radar 400 steers along the curvature of the road and also applies active localization and mapping to steer beams only along the curvature of the road. This selective scanning mode is more efficient, as it allows the radar 400 to align its beams towards the area of interest rather than waste any scanning on areas without objects or useful information to the vehicle. In various examples, the selective scanning mode is implemented by changing the chirp slope of the FMCW signals generated by the transceiver 406 and by shifting the phase of the transmitted signals to the steering angles needed to cover the curvature of the road.

Objects are detected with radar 400 by reflections or echoes that are received at the series of receive antennas 410-414, which are directed by PS circuits 420-424. Low Noise Amplifiers ("LNAs") are positioned between receive antennas 410-414 and PS circuits 420-424, which include PSs similar to the PSs in PS circuits 416-418. For receive operation, PS circuits 410-424 create phase differentials between radiating elements in the receive antennas 410-414 to compensate for the time delay of received signals between radiating elements due to spatial configurations. Receive phase shifting, also referred to as analog beamforming, combines the received signals for aligning echoes to identify the location, or position of a detected object. That is, phase shifting aligns the received signals that arrive at different times at each of the radiating elements in receive antennas 410-414. Similar to PS circuits 416-418 on the transmit chain, PS circuits 420-424 are controlled by FPGA 426, which provides the voltages to each PS to generate the desired phase shifts. FPGA 426 also provides bias voltages to the LNAs 438-442.

The receive chain then combines the signals received at receive antennas 412 at combination network 444, from which the combined signals propagate to the transceiver 406. Note that as illustrated, combination network 444 generates two combined signals 446-448, with each signal combining signals from a number of elements in the receive antennas 412. In one example, receive antennas 412 include 48 radiating elements and each combined signal 446-448 combines signals received by 24 of the 48 elements. Other examples may include 8, 16, 24, or 32 elements, and so on, depending on the desired configuration. The higher the number of antenna elements, the narrower the beam width.

Note also that the signals received at receive antennas 410 and 414 go directly from PS circuits 420 and 424 to the transceiver 406. Receive antennas 410 and 414 are guard antennas that generate a radiation pattern separate from the main beams received by the 48-element receive antenna 412. Guard antennas 410 and 414 are implemented to effectively eliminate side-lobe returns from objects. The goal is for the guard antennas 410 and 414 to provide a gain that is higher than the side lobes and therefore enable their elimination or reduce their presence significantly. Guard antennas 410 and 414 effectively act as a side lobe filter.

Once the received signals are received by transceiver 406, they are processed by processing engines 450. Processing engines 450 include perception engine 404 which detects and identifies objects in the received signal with neural networks and artificial intelligence techniques, database 452 to store historical and other information for radar 400, and a Digital Signal Processing ("DSP") engine 454 with an Analog-to-Digital Converter ("ADC") module to convert the analog signals from transceiver 406 into digital signals that can be processed to determine angles of arrival and other valuable information for the detection and identification of objects by perception engine 404. In one or more implementations, DSP engine 454 may be integrated with the microcontroller 460 or the transceiver 406. In one or more implementations, the various processing engines 450 may be integrated in one processor or multiple processors, such as by having a specialized DSP processor for DSP engine 454 and a specialized AI processor for perception engine 404. In various examples, the specialized AI processor may also host the camera and lidar perception engines in the multi-sensor fusion platform.

Radar 400 also includes a Graphical User Interface ("GUI") 456 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In addition, radar 400 has temperature sensors 458 for sensing the temperature around the vehicle so that the proper voltages from FPGA 426 may be used to generate the desired phase shifts. The voltages stored in FPGA 426 are determined during calibration of the antennas under different operating conditions, including temperature conditions. A database 462 may also be used in radar 400 to store radar and other useful data.

The radar data received at the transceiver 406 and transmitted to perception engine 404 for processing is in a multi-dimensional format having data tuples of the form ($r_i$, $\theta_i$, $\phi_i$, $I_i$, $v_i$), where $r_i$, $\theta_i$, $\phi_i$ represent the location coordinates of an object with n denoting the range or distance between the radar 400 and the object along its line of sight, $\theta_i$ denoting the azimuthal angle, $\phi_i$ denoting the elevation angle, $I_i$ representing the intensity or reflectivity indicating the amount of transmitted power returned to the transceiver 406, and $v_i$ being the speed between the radar 400 and the object along its line of sight. The radar data can be represented by a range-doppler map showing the detected objects' range and velocity.

Figure 5:
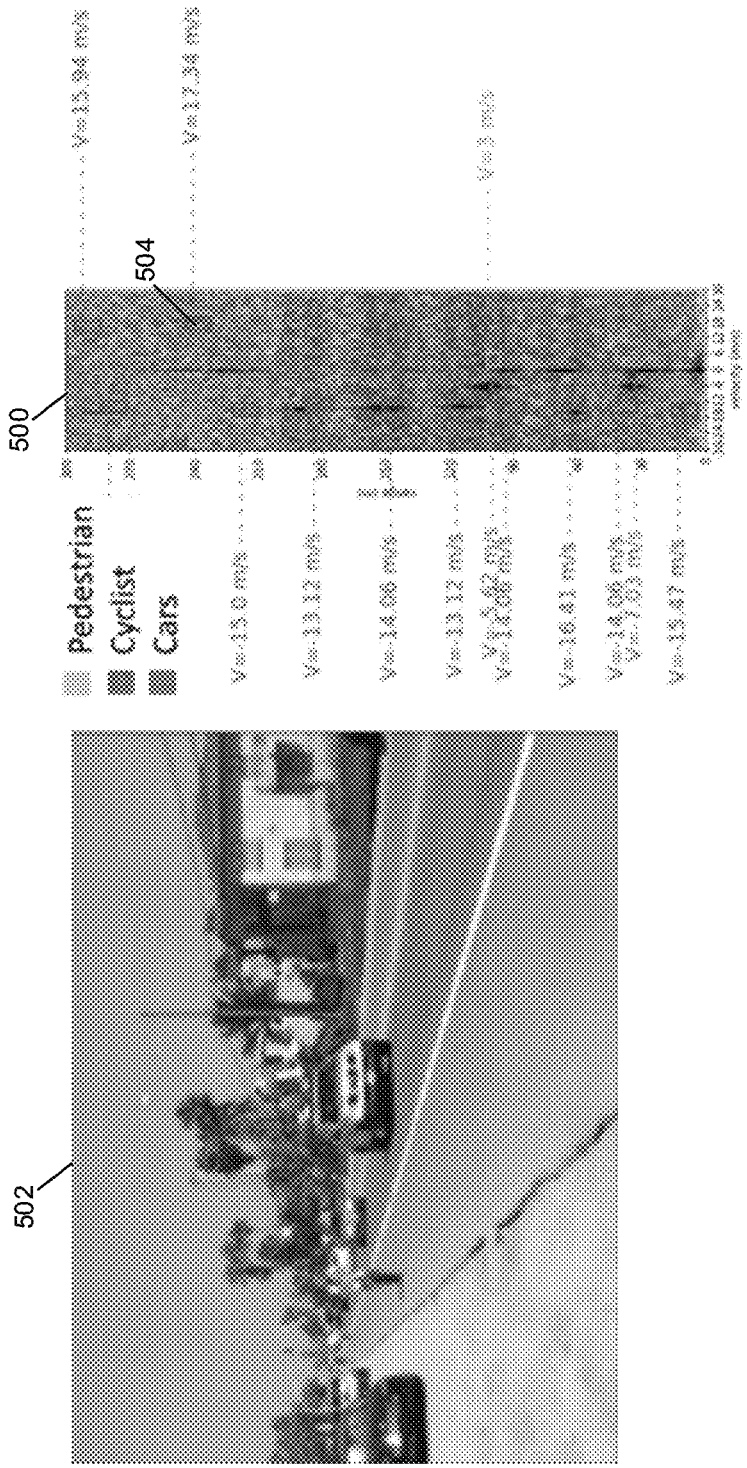
FIG. 5 illustrates an example range-doppler map captured by the beam steering radar system of FIG. 3 for an outdoor scene.

FIG. 5 illustrates an example range-doppler map 500 for the scene 502. Radar 400 is able to capture data relating to the cars, pedestrians and cyclists in the scene 502, whether in movement or stationary. As illustrated, the objects detected in scene 502 are shown in the range-doppler map with bounded boxes, e.g., bounded box 504. Initially, all data acquired by the radar 400 is in the form of unlabeled data, i.e., range-doppler maps that solely display the range and velocity information of detected objects. These unlabeled range-doppler maps do not indicate the category of the objects detected, that is, there is no way of knowing which objects appear on an unlabeled range-doppler map or even which pixels in the range-doppler map correspond to detected objects in the first place. The goal is to label the data with bounded boxes or other labeling means to not only detect but also identify and categorize the objects. As described below, this is accomplished by training a radar neural network in perception engine 404 to label the data as accurately as possible with the use of a multi-sensor fusion platform. Initially, human annotators label a small set of data in acquired range-doppler maps. Training of the radar network is bootstrapped by trained camera and lidar networks. The human labeled data can be used to determine the accuracy of each network.

Figure 6:
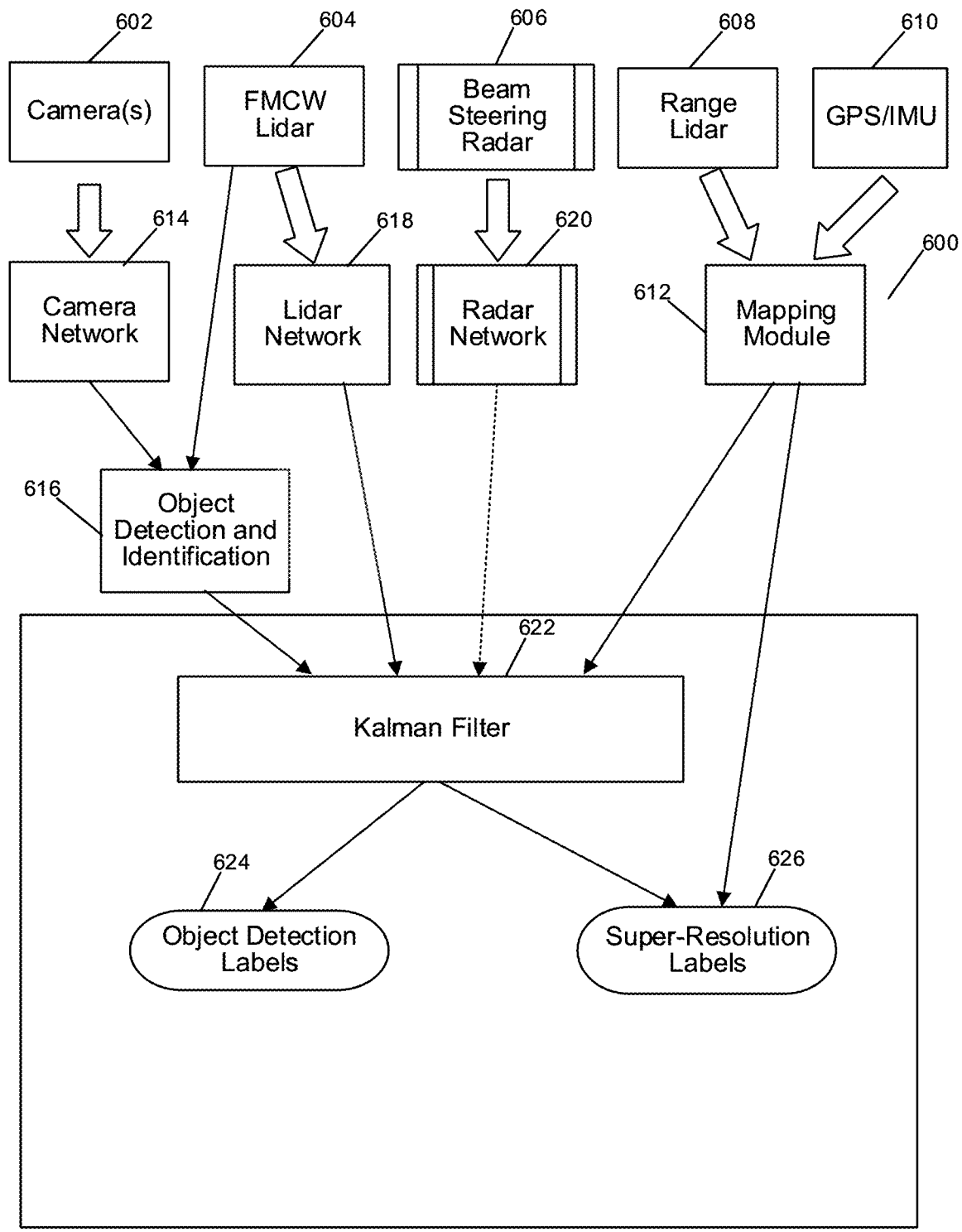
FIG. 6 is a schematic diagram of a multi-sensor fusion platform in accordance with various examples.

Attention is now directed to FIG. 6, which shows a schematic diagram of a multi-sensor fusion platform in accordance with various examples. Multi-sensor platform 600 receives input data from multiple sensors in an ego vehicle: camera sensors 602, FMCW lidar 604, beam steering radar 606 (implemented as radar 400 of FIG. 4), range lidar 608, and global positioning system/integrated mapping unit (GPS/IMU) sensor 610. Each one of these sensors provide data inputs to the multi-sensor fusion platform 600: camera sensors 602 provide camera data, FMCW lidar 604 provides lidar range data as well as velocity information, beam steering radar 606 provides range-doppler maps, range lidar 608 provides lidar range data, and GPS/IMU sensor 610 provides map data that can be used to enhance the lidar data from lidar 608 in mapping module 612. Data from the camera sensors 602 is input into a camera perception engine with camera network 614 to extract range and velocity information of detected objects as well as their category (e.g., vehicles, pedestrians, cyclists, animals, infrastructure, etc.) in Object Detection and Identification module 616. Data from the FMCW lidar 604 is used to extract range and velocity information in module 616 together with the camera data from camera network 614. Data from the FMCW lidar 604 is input into a lidar perception engine with lidar network 618 that is trained to detect and identify objects in lidar point clouds.

Both camera network 614 and lidar network 618 are neural networks trained on a vast collection of publicly available data sets. The trained networks enable the detection and identification of objects in both camera and FMCW lidar data. The trained networks also bootstrap the training of radar network 620 for detecting and identifying objects in radar data (i.e., range-doppler maps) acquired by beam steering radar 606. The radar network 620 is implemented in a radar perception engine, such as perception engine 404 of FIG. 4. The object detection and identification data resulting from the object detection and identification module 616, lidar network 618, radar network 620 and mapping module 612 are input into a Kalman filter 622 for tracking the objects over time. The Kalman filter 622 matches candidate objects detected by the camera, lidar and radar networks with objects it has detected in previous time windows. By combining information from previous measurements, expected measurement uncertainties, and some physical knowledge, the Kalman filter 622 can generate robust, accurate estimates of moving objects. The result are object detection labels 624 and super-resolution labels 626 that are used to train the radar network 620. As the radar network 620 is trained, the labels are regenerated to improve the performance/accuracy of the object detection and identification over time.

Figure 7:
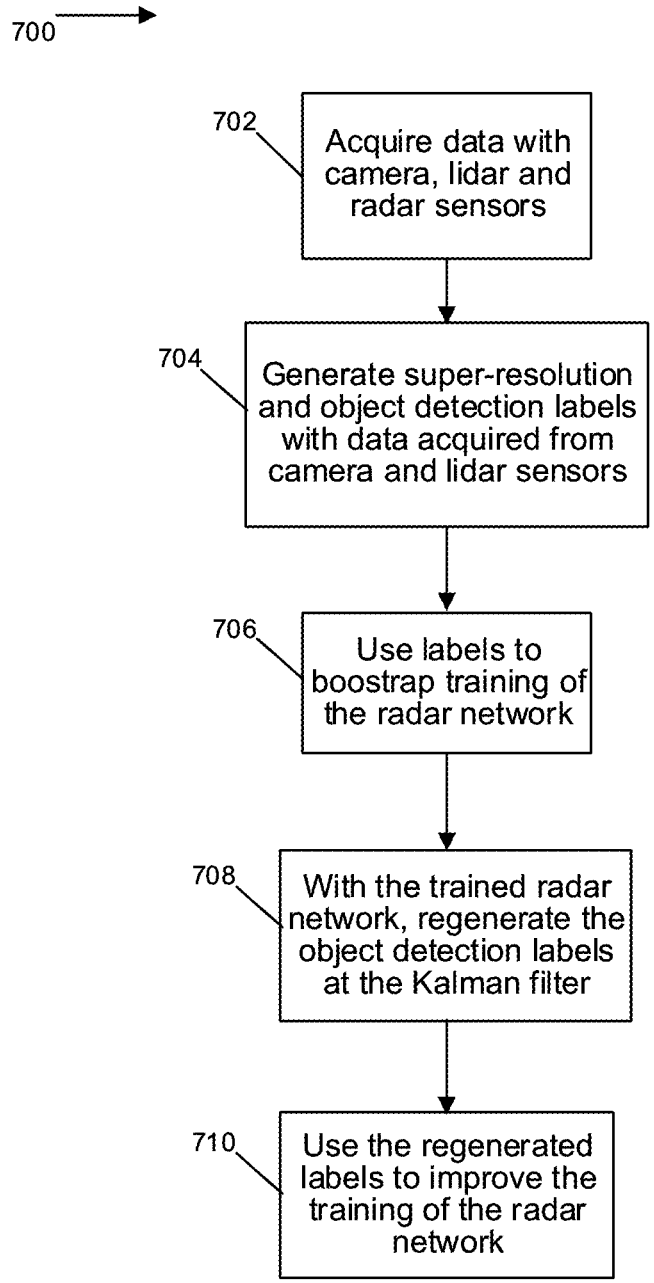
FIG. 7 is a flowchart for bootstrapping training of a beam steering radar in accordance with various implementations of the subject technology.

FIG. 7 shows a flowchart for bootstrapping the training of the beam steering radar 606 in accordance with various implementations of the subject technology. For explanatory purposes, the example process 700 of FIG. 7 is primarily described herein with reference to the multi-sensor fusion platform 600 of FIG. 6 and the beam steering radar 400 of FIG. 4; however, the example process 700 is not limited to the multi-sensor fusion platform 600 of FIG. 6 and the beam steering radar 400 of FIG. 4. Further for explanatory purposes, the blocks of the example process 700 are described herein as occurring in series, or linearly. However, multiple blocks of the example process 700 can occur in parallel. In addition, the blocks of the example process 700 can be performed in a different order than the order shown and/or one or more of the blocks of the example process 700 may not be performed.

First, data is acquired by an ego vehicle with camera, lidar and beam steering radar sensors (702). The ego vehicle may be, for example, ego vehicle 200 with autonomous driving system 300 and beam steering radar 400 in a multi-sensor fusion platform 600. Next, the multi-sensor fusion sensor platform generates super-resolution and object detection labels with the data acquired from the camera and lidar sensors (702). The labels are generated from the camera and lidar networks, the Kalman filter, and the mapping module in the multi-sensor fusion platform in the ego vehicle (e.g., camera network 614 and lidar network 618 through object detection and identification module 616, Kalman filter 622, and mapping module 612 in multi-sensor fusion platform 600). The super-resolution labels are used in a super-resolution network for increasing the resolution of radar data for human annotators. The object detection and super-resolution labels are then used to bootstrap training of the radar network (706) and regenerate the object detection labels at the Kalman filter (708). The regenerated labels can then be used to improve the training and the performance accuracy of the radar network over time (710).

Figure 8:
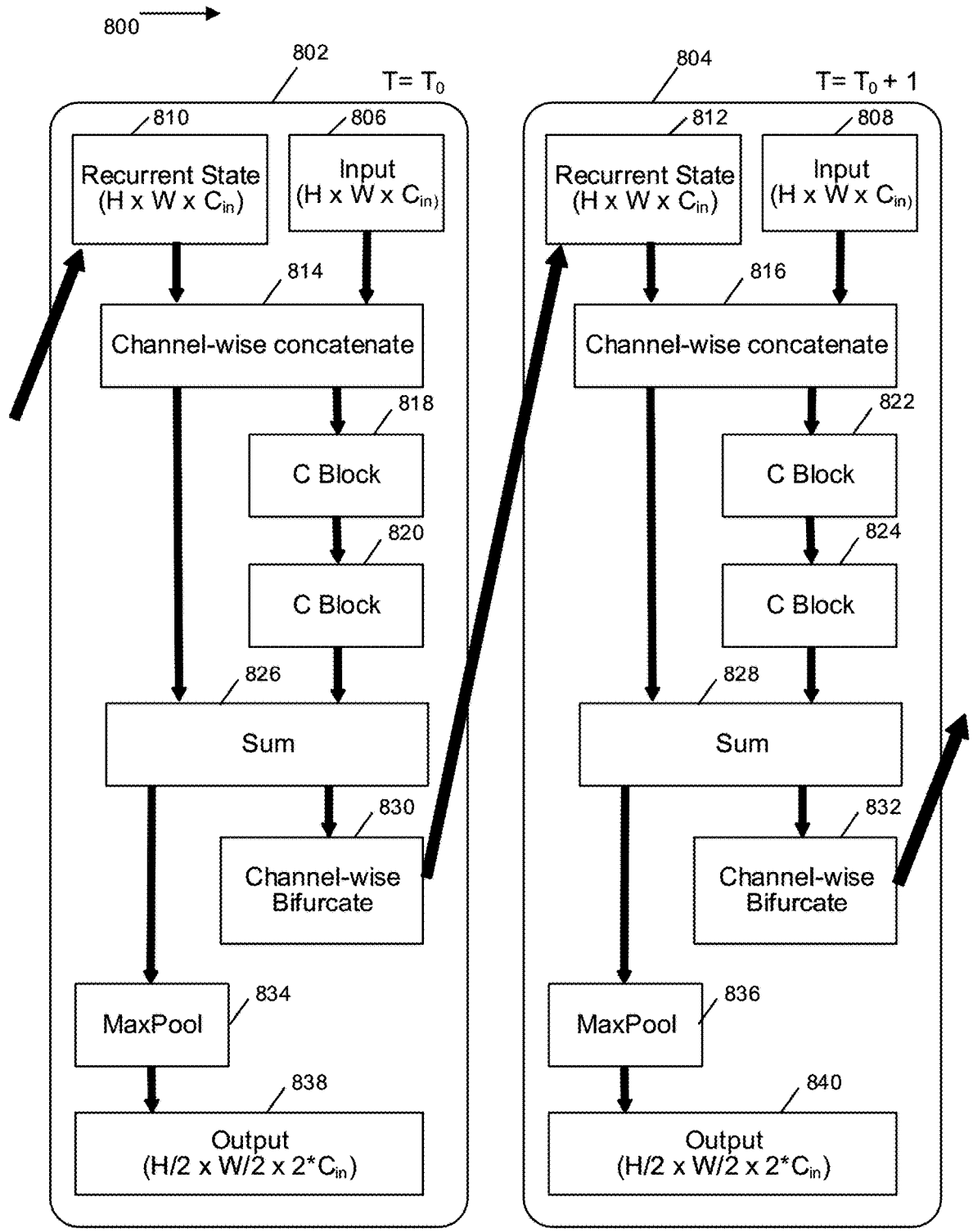
FIG. 8 is a schematic diagram of an object detection network for a beam steering radar in accordance with various implementations of the subject technology.

Attention is now directed to FIG. 8, which shows an example implementation for an object detection network for a beam steering radar. Object detection network 800 is composed of layers of two-way residual blocks 802 and 804 for times $T=T_0$ and $T=T_0+1$, respectively. In various examples, the network 800 is implemented with 6 such layers for 8 input channels. Each two-way residual block takes in the radar data as inputs 806, 808 and the recurrent states 810, 812 to perform a channel-wise concatenation operation 814, 816. The network then proceeds to two convolutional blocks, 818-820 in block 802 and 822-824 in block 804, before the results from the convolution operation are added to the results from the channel-wise concatenation at summing operations 826 in block 802 and 828 in block 804. The network blocks 802-804 then proceed to perform channel-wise bifurcations 830-832 for a skip connection and max pooling operations 834-836 to generate the residual block outputs 836 in block 802 and 838 in block 804. These residual block outputs are in effect residuals between a ground truth output and the acquired radar data input. As it is easier to learn residuals, training of the network 800 is accelerated.

It is appreciated that for training neural networks, the more training data the better. The use of the two-way residual blocks 802-804 enables the network 800 to train more quickly and reduce delays due to collection and labelling. Residual blocks have been shown to accelerate the training and improve the performance of deep neural networks. The two-way residual blocks 802-804 are designed specifically for radar data and residual operation between layers and timestamps.

Figure 9:
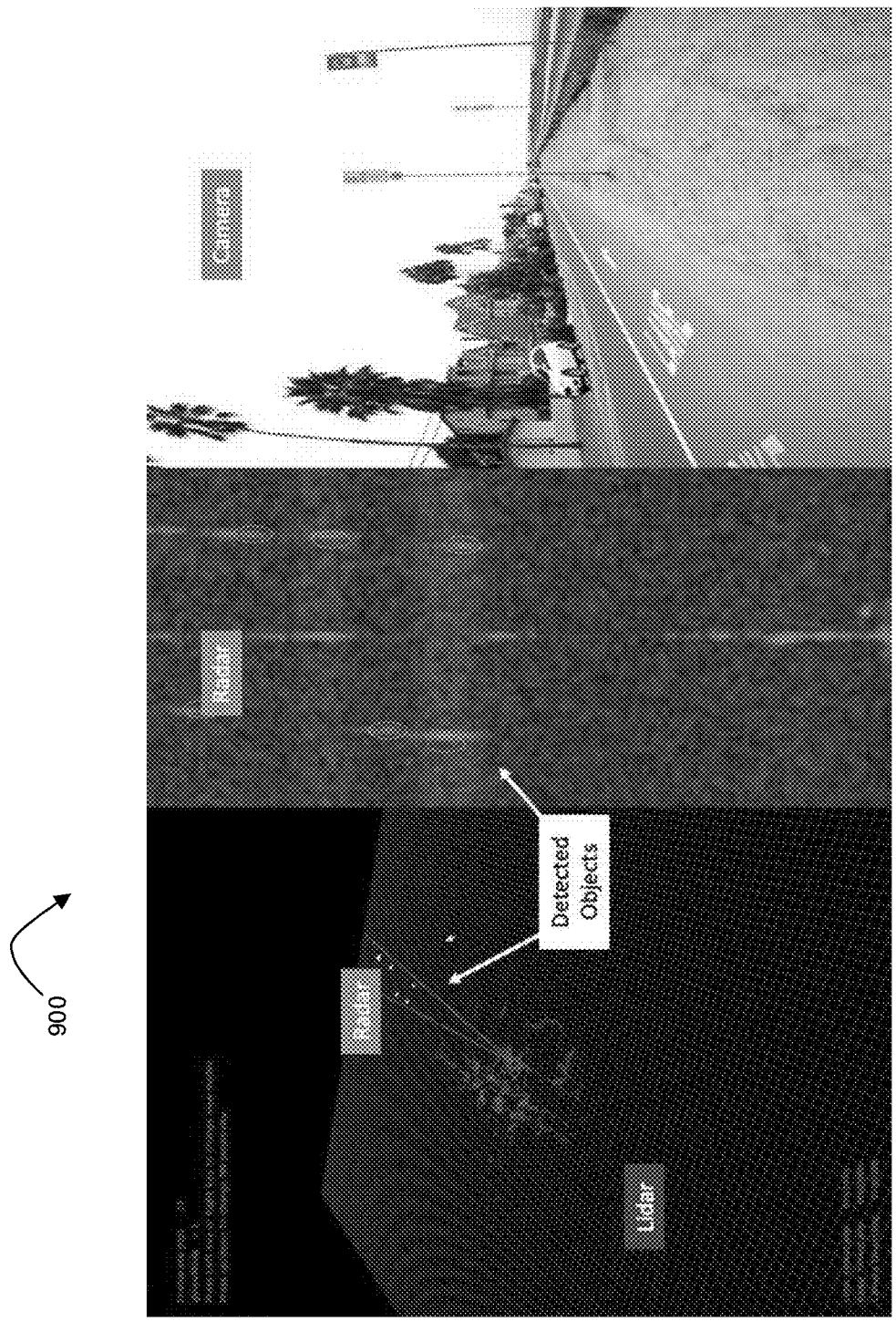
FIGS. 9-12 illustrate results of a multi-sensor fusion platform as in FIG. 6 in accordance to various examples.
Figure 10:
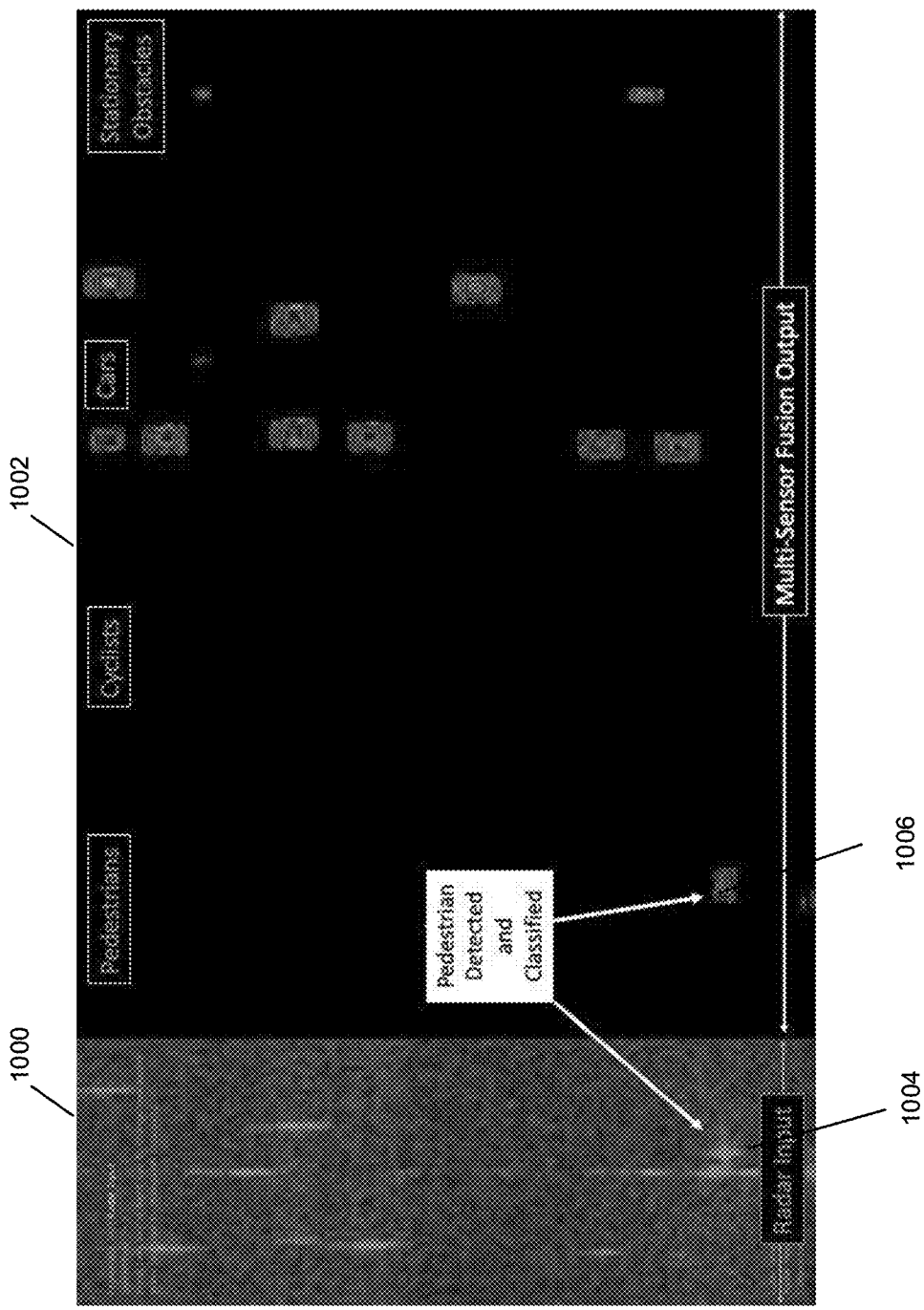
Figure 11:
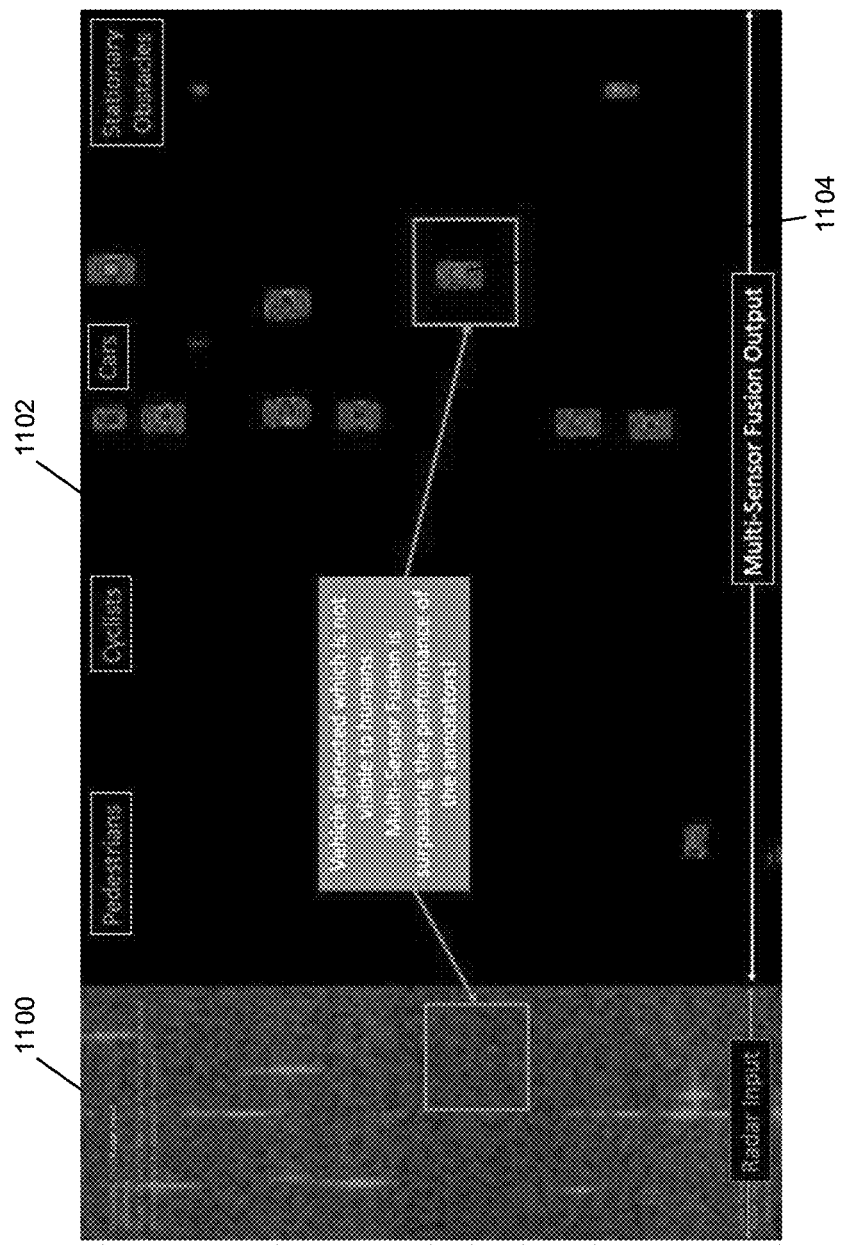
Figure 12:
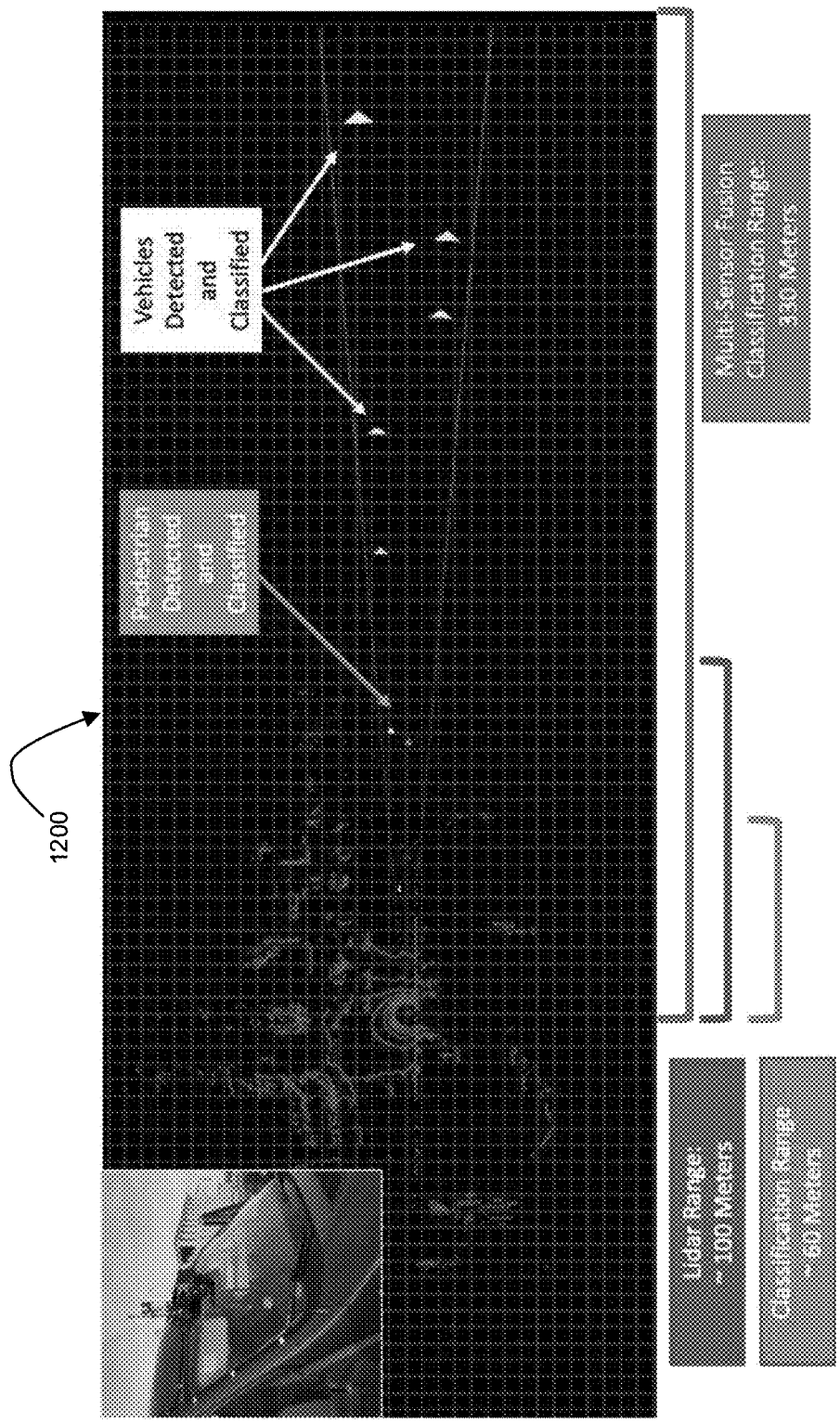

FIGS. 9-12 show some results of the multi-sensor fusion platform described herein above. In FIG. 9, lidar, radar and camera data 900 are shown side by side to illustrate the difference in the acquired data and detected objects in each sensor. FIG. 10 shows radar input 1000 next to multi-sensor fusion output 1002 illustrating an object 1006 visible in the range-doppler map that is detected and identified as pedestrian 1004 in the multi-sensor fusion output 1006. In FIG. 11, multi-sensor fusion output 1102 shows a vehicle 1104 detected from the radar input 1100 that is not visible to human annotators. Lastly, in FIG. 12, the performance advantages of the multi-sensor fusion platform are highlighted with the output data showing pedestrians and vehicles detected and classified in the data 1200 at a long range of 330 meters.

The multi-sensor fusion platform described herein above supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world.

Figure 13:
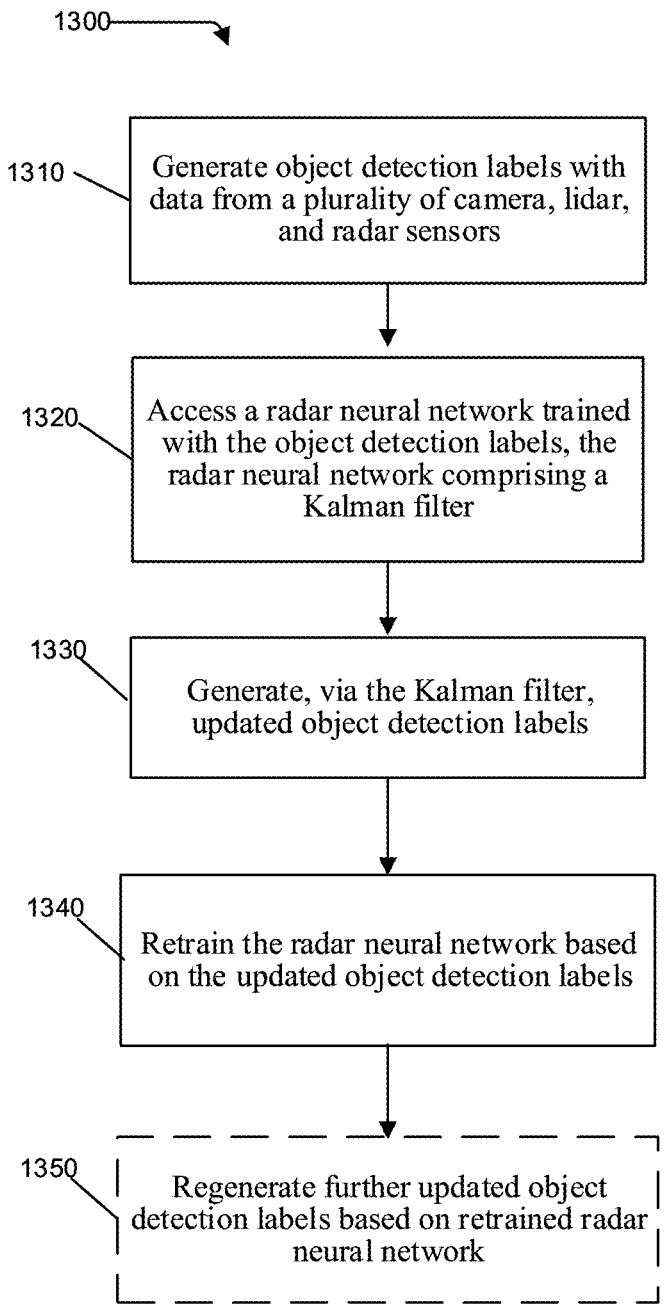
FIG. 13 is a flowchart for a method of object detection and classification using a multi-sensor fusion platform in accordance with various implementations of the subject technology.

FIG. 13 is a flowchart for a method 1300 of object detection and classification using a multi-sensor fusion platform in accordance with various implementations of the subject technology. For explanatory purposes, the example method 1300 of FIG. 13 is primarily described herein with reference to the multi-sensor fusion platform 600 of FIG. 6 and the beam steering radar 400 of FIG. 4; however, the example method 1300 is not limited to the multi-sensor fusion platform 600 of FIG. 6 and the beam steering radar 400 of FIG. 4. Further for explanatory purposes, the blocks of the example method 1300 are described herein as occurring in series, or linearly. However, multiple blocks of the example method 1300 can occur in parallel. In addition, the blocks of the example method 1300 can be performed in a different order than the order shown and/or one or more of the blocks of the example method 1300 may not be performed.

As illustrated in FIG. 13, the method 1300 includes generating object detection labels with data from a plurality of camera, lidar, and radar sensors, at step 1310. The plurality of camera, lidar, and radar sensors are included in an autonomous vehicle. The autonomous vehicle may further include additional components or modules, such as for example, camera network 614 and lidar network 618 through object detection and identification module 616, Kalman filter 622, and mapping module 612 in multi-sensor fusion platform 600. In some embodiments, the radar sensor is a beam steering radar as disclosed herein. At step 1320, the method 1300 includes training a radar neural network with the object detection labels or accessing a radar neural network trained with object detection labels, the radar neural network comprising a Kalman filter, such as the Kalman filter 622 as described in FIG. 6. The method 1300 includes, at step 1330, generating or accessing, via the Kalman filter, updated object detection labels. At step 1340, the method 1300 includes retraining the radar neural network based on the updated object detection labels. In various embodiments, the object detection labels include bounded boxes for identification and categorizing of one or more detected objects. In various embodiments, training or retraining the radar neural network is bootstrapped by trained camera and lidar neural networks. In various embodiments, the generation of the updated object detection labels via the Kalman filter includes matching candidate objects detected by one or more of the plurality of camera, lidar, and radar sensors with objects that have been detected in previous time windows. In addition, the method 1300 may optionally include regenerating further updated object detection labels based on retrained radar neural network, at step 1350. In various embodiments, the regenerated labels can then be used to improve the training and the performance accuracy of the radar neural network over time.

Figure 14:
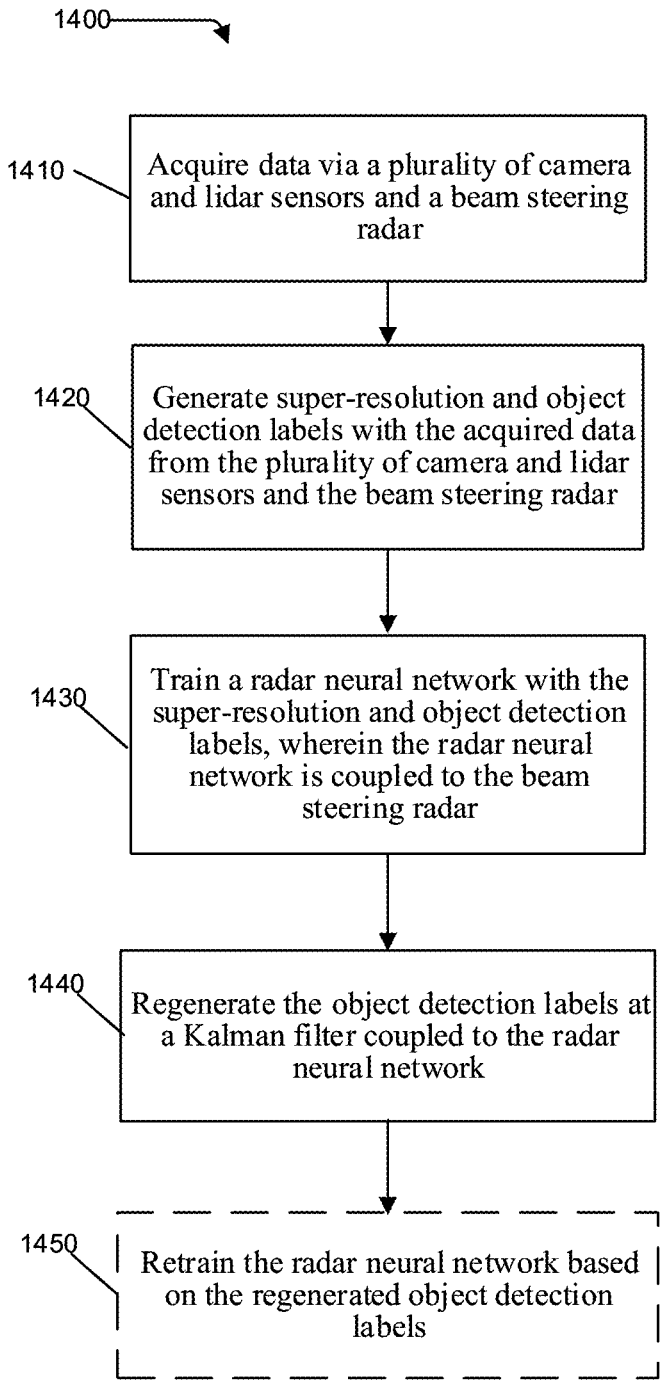
FIG. 14 is a flowchart for a method of object detection and classification using a multi-sensor fusion platform in accordance with various implementations of the subject technology.

FIG. 14 is a flowchart for a method 1400 of object detection and classification using a multi-sensor fusion platform in accordance with various implementations of the subject technology. For explanatory purposes, the example method 1400 of FIG. 14 is primarily described herein with reference to the multi-sensor fusion platform 600 of FIG. 6 and the beam steering radar 400 of FIG. 4; however, the example method 1400 is not limited to the multi-sensor fusion platform 600 of FIG. 6 and the beam steering radar 400 of FIG. 4. Further for explanatory purposes, the blocks of the example method 1400 are described herein as occurring in series, or linearly. However, multiple blocks of the example method 1400 can occur in parallel. In addition, the blocks of the example method 1400 can be performed in a different order than the order shown and/or one or more of the blocks of the example method 1400 may not be performed.

As illustrated in FIG. 14, the method 1400 includes acquiring data via a plurality of camera and lidar sensors and a beam steering radar, at step 1410. The plurality of camera and lidar sensors, and the beam steering radar are components in an autonomous vehicle. The autonomous vehicle may further include additional components or modules, such as for example, camera network 614 and lidar network 618 through object detection and identification module 616, Kalman filter 622, and mapping module 612 in multi-sensor fusion platform 600. In some embodiments, the radar sensor is a beam steering radar as disclosed herein. At step 1420, the method 1400 includes generating super-resolution and object detection labels with acquired data from the plurality of camera and lidar sensors or accessing super-resolution and object detection labels generated with acquired data from the plurality of camera and lidar sensors. The method 1400 includes, at step 1430, training or retraining a radar neural network with the super-resolution and object detection labels, wherein the radar neural network is coupled to the beam steering radar. At step 1440, the method 1400 includes regenerating the object detection labels at a Kalman filter, such as the Kalman filter 622 as described in FIG. 6, coupled to the radar neural network. In various embodiments, the method further includes increasing resolution of radar data for human annotators using the super-resolution labels in a super-resolution network. In various embodiments, the object detection labels include bounded boxes for identification and categorizing of one or more detected objects. In various embodiments, training the radar neural network is bootstrapped by trained camera and lidar neural networks. In various embodiments, regenerating of the object detection labels at the Kalman filter includes matching candidate objects detected in the acquired data with objects that have been detected in previous time windows. In addition, the method 1400 may optionally include retraining the radar neural network based on the regenerated object detection labels, at step 1450. In various embodiments, the regenerated labels can then be used to improve the training and the performance accuracy of the radar neural network over time.

Figure 15:
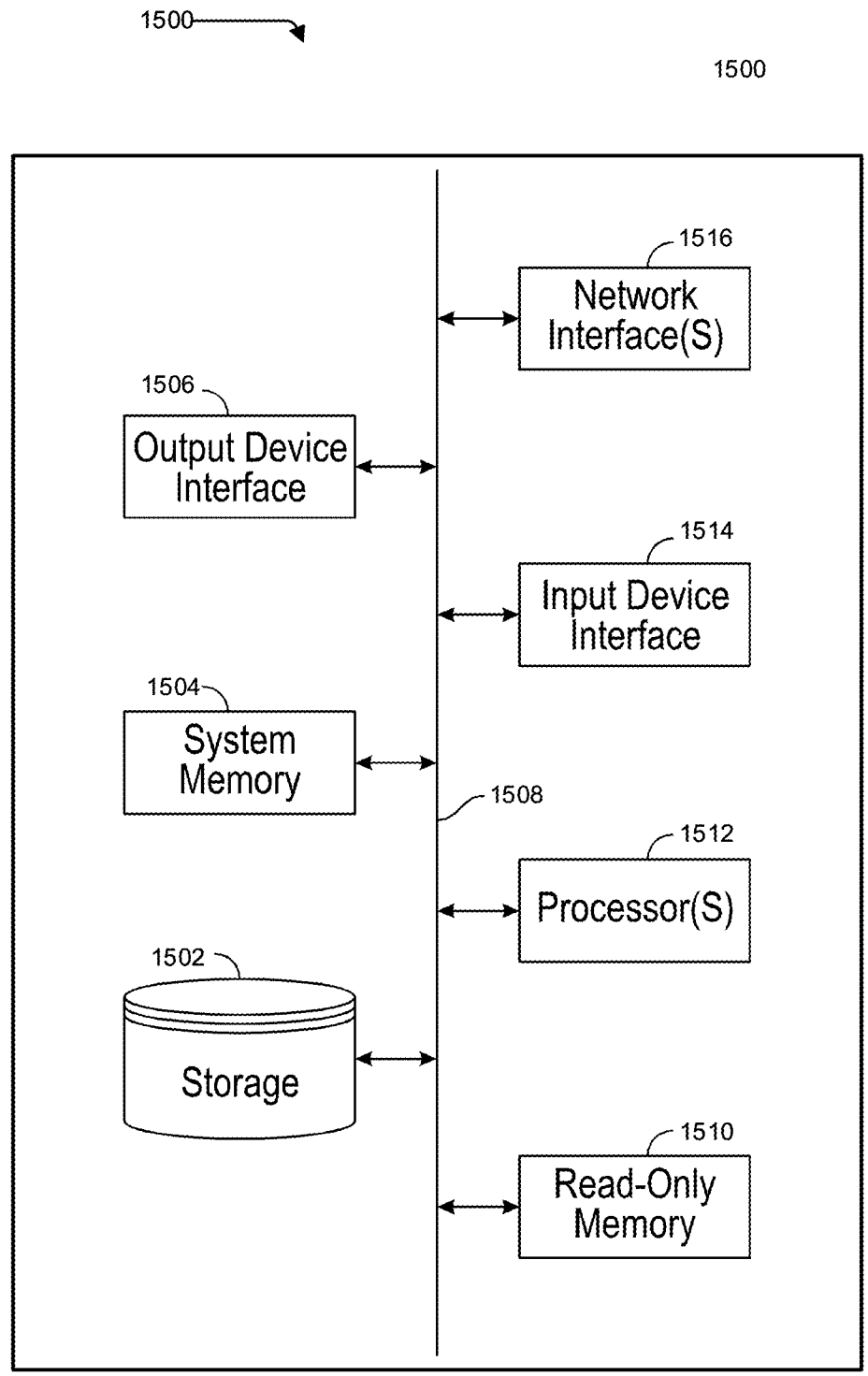
FIG. 15 conceptually illustrates an electronic system with which one or more implementations of the subject technology may be implemented.

FIG. 15 conceptually illustrates an electronic system 1500 with which one or more implementations of the subject technology may be implemented. For example, each of the perception engines, including but not limited to, for example, a radar perception engine, a camera perception engine, and a lidar perception engine, along with their respective neural networks, including but not limited to, for example, a radar neural network, a camera neural network, and a lidar neural network, may be implemented via the electronic system 1500 or via any of the components within the electronic system 1500. In addition, the electronic system 1500 or any of the components within the electronic system 1500 can be configured to process any of methods 700, 1300, and 1400 to perform the various method or process steps in their respective methods, including, for example, but not limited to method or process steps related to training, retraining, generating, regenerating, accessing, and acquiring.

As illustrated in FIG. 15, the electronic system 1500, for example, can be a computer, a server, or generally any electronic device that executes a program. Such an electronic system includes various types of computer readable media and interfaces for various other types of computer readable media. The electronic system 1500 includes a bus 1508, one or more processing unit(s) 1512, a system memory 1504 (and/or buffer), a read-only memory (ROM) 1510, a permanent storage device 1502, an input device interface 1514, an output device interface 1506, and one or more network interfaces 1516, or subsets and variations thereof.

The bus 1508 collectively represents all system, peripheral, and chipset buses that communicatively connect the numerous internal devices of the electronic system 1500. In one or more implementations, the bus 1508 communicatively connects the one or more processing unit(s) 1512 with the ROM 1510, the system memory 1504, and the permanent storage device 1502. From these various memory units, the one or more processing unit(s) 1512 retrieves instructions to execute and data to process in order to execute the processes of the subject disclosure. For example, the processing unit(s) 1512 can execute instructions that perform one or more processes, such as processes 300 and 700. The one or more processing unit(s) 1512 can be a single processor or a multi-core processor in different implementations.

The ROM 1510 stores static data and instructions that are needed by the one or more processing unit(s) 1512 and other modules of the electronic system 1500. The permanent storage device 1502, on the other hand, may be a read-and-write memory device. The permanent storage device 1502 may be a non-volatile memory unit that stores instructions and data even when the electronic system 1500 is off. In one or more implementations, a mass-storage device (such as a magnetic or optical disk and its corresponding disk drive) may be used as the permanent storage device 1502.

In one or more implementations, a removable storage device (such as a floppy disk, flash drive, and its corresponding disk drive) may be used as the permanent storage device 1502. Like the permanent storage device 1502, the system memory 1504 may be a read-and-write memory device. However, unlike the permanent storage device 1502, the system memory 1504 may be a volatile read-and-write memory, such as a random access memory. The system memory 1504 may store any of the instructions and data that one or more processing unit(s) 1512 may need at runtime. In one or more implementations, the processes of the subject disclosure are stored in the system memory 1504, the permanent storage device 1502, and/or the ROM 1510. From these various memory units, the one or more processing unit(s) 1512 retrieves instructions to execute and data to process in order to execute the processes of one or more implementations.

The bus 1508 also connects to the input and output device interfaces 1514 and 1506. The input device interface 1514 enables a user to communicate information and select commands to the electronic system 1500. Input devices that may be used with the input device interface 1514 may include, for example, alphanumeric keyboards and pointing devices (also called "cursor control devices"). The output device interface 1506 may enable, for example, the display of images generated by electronic system 1500. Output devices that may be used with the output device interface 1506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 15, the bus 1508 also couples the electronic system 1500 to a network (not shown) and/or to one or more devices through the one or more network interface(s) 1516, such as one or more wireless network interfaces. In this manner, the electronic system 1500 can be a part of a network of computers (such as a local area network ("LAN"), a wide area network ("WAN"), or an Intranet, or a network of networks, such as the Internet. Any or all components of the electronic system 1500 can be used in conjunction with the subject disclosure.

In accordance with various embodiments, a multi-sensor fusion platform of an autonomous vehicle having a beam steering radar is described. The multi-sensor fusion platform includes a camera perception engine comprising a camera neural network. The multi-sensor fusion platform includes the camera perception engine configured to detect and identify one or more objects in camera data, a lidar perception engine comprising a lidar neural network, the lidar perception engine configured to detect and identify one or more objects in lidar data. The multi-sensor fusion platform also includes a radar perception engine comprising a radar neural network, the radar perception engine coupled to the beam steering radar and configured to detect and identify one or more objects in radar data from the beam steering radar. In various embodiments, training of the radar neural network is bootstrapped by training of the camera perception engine and the lidar perception engine.

In accordance with various embodiments of the multi-sensor fusion platform, the training of the radar perception engine is bootstrapped with the camera and lidar neural networks. In some embodiments, information from the camera perception engine and the lidar perception engine augment object detection and identification capabilities of the radar precepting engine. In various embodiments, the radar perception engine is configured to adjust scanning parameters of the beam steering radar to avoid or minimize interference from one or more interfering radar signals that is determined to be interfering with the autonomous vehicle.

In various embodiments, the autonomous vehicle further comprises one or more cameras, one or more lidars, one or more infrastructure sensors, one or more environmental sensors, one or more operational sensors, or one or more user preference sensors. In various embodiments, the one or more environmental sensors is configured to detect a weather condition (or a changing weather condition) or a visibility condition (or a changing visibility condition) of an environment of the autonomous vehicle. In various embodiments, the one or more environmental sensors is further configured to be turned off or reduces its sampling rate based on the detected weather condition or the detected visibility condition. In various embodiments, the beam steering radar reduces a width of a radar beam transmitted to provide a more focused beam for a finer sensing capability.

In various embodiments, the training of the radar neural network includes labeling the radar data with bounded boxes and identifying and categorizing the one or more detected objects based on the labeling. In various embodiments, the one or more detected and identified objects based on the camera data, the lidar data, and the radar data are input into a Kalman filter for tracking over time.

In accordance with various embodiments, an object detection and classification method is described. The method includes generating object detection labels with data from a plurality of camera, lidar, and radar sensors, accessing a radar neural network trained with the object detection labels, the radar neural network comprising a Kalman filter, generating, via the Kalman filter, updated object detection labels, and retraining the radar neural network based on the updated object detection labels. In various embodiments, the method further includes training the radar neural network with the object detection labels prior to the accessing.

In various embodiments of the method, the object detection labels comprise bounded boxes that enables identification and categorization of one or more detected objects. In various embodiments, training the radar neural network is bootstrapped by trained camera and lidar neural networks. In various embodiments, the generation of the updated object detection labels via the Kalman filter includes matching candidate objects detected by one or more of the plurality of camera, lidar, and radar sensors with objects that have been detected in previous time windows.

In various embodiments, the method further includes regenerating further updated object detection labels based on the retrained radar neural network.

In accordance with various embodiments, a method for object detection and classification is described. The method includes acquiring data via a plurality of camera and lidar sensors, and a beam steering radar, generating super-resolution and object detection labels with acquired data from the plurality of camera and lidar sensors, training a radar neural network with the super-resolution and object detection labels, wherein the radar neural network is coupled to the beam steering radar, and regenerating the object detection labels at a Kalman filter coupled to the radar neural network.

In various embodiments, the method further includes increasing resolution of radar data for human annotators using the super-resolution labels in a super-resolution network. In some embodiments, training the radar neural network is bootstrapped by trained camera and lidar neural networks. In various embodiments, regenerating of the object detection labels at the Kalman filter includes matching candidate objects detected in the acquired data with objects that have been detected in previous time windows.

In various embodiments, the method further includes retraining the radar neural network based on the regenerated object detection labels.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A radar system, comprising:
   a camera perception engine comprising a camera neural network, the camera perception engine configured to detect and identify one or more objects in camera data;
   a lidar perception engine comprising a lidar neural network, the lidar perception engine configured to detect and identify one or more objects in lidar data;
   a system controller for controlling the radar system; and
   a radar perception engine comprising a radar neural network, the radar perception engine coupled to a beam steering radar and configured to detect and identify one or more objects in radar data from the beam steering radar,
   wherein the system controller is adapted for training of the radar neural network using training of the camera perception engine and the lidar perception engine.

2. The radar system of claim 1, wherein training of the radar perception engine uses information from training of the camera and lidar neural networks.

3. The radar system of claim 1, wherein information from the camera perception engine and the lidar perception engine augment object detection and identification capabilities of the radar precepting engine.

4. The radar system of claim 1, wherein the radar perception engine is further configured to adjust scanning parameters of the beam steering radar to avoid or minimize interference from one or more interfering radar signals that is determined to be interfering with an autonomous vehicle.

5. The radar system of claim 4, wherein the autonomous vehicle comprises one or more cameras, one or more lidars, one or more infrastructure sensors, one or more environmental sensors, one or more operational sensors, or one or more user preference sensors.

6. The radar system of claim 5, wherein the one or more environmental sensors is configured to detect a weather condition or a visibility condition of an environment of the autonomous vehicle.

7. The radar system of claim 6, wherein the one or more environmental sensors is further configured to be turned off or reduce its sampling rate based on the detected weather condition or the detected visibility condition.

8. The radar system of claim 7, wherein the beam steering radar reduces a width of a radar beam transmitted to provide a more focused beam for a finer sensing capability.

9. The radar system of claim 1, wherein the training of the radar neural network includes annotating the radar data with bounded boxes and identifying and categorizing the one or more detected objects based on the annotating.

10. The radar system of claim 1, wherein the one or more detected and identified objects based on the camera data, the lidar data, and the radar data are input into a Kalman filter for tracking over time.

11. An object detection and classification method for a radar system, comprising:
    generating object detection labels by annotating data from a plurality of camera, lidar, and radar sensors;
    accessing a radar neural network trained with the object detection labels, the radar neural network comprising a Kalman filter;
    generating, via the Kalman filter, updated object detection labels; and
    retraining the radar neural network based on the updated object detection labels.

12. The method of claim 11, wherein the object detection labels comprise bounded boxes that enable identification and categorization of one or more detected objects.

13. The method of claim 11, wherein the radar neural network is further trained based on trained camera and lidar neural networks.

14. The method of claim 11, wherein the generation of the updated object detection labels via the Kalman filter includes matching candidate objects detected by one or more of the plurality of camera, lidar, and radar sensors with objects that have been detected in previous time windows.

15. The method of claim 11, further comprising:
    regenerating the updated object detection labels based on the retrained radar neural network.

16. The method of claim 15, further comprising:
    retraining the radar neural network based on the regenerated updated object detection labels.

17. A method for object detection and classification in a radar system, comprising:
    acquiring data via a plurality of camera and lidar sensors and a beam steering radar;
    generating super-resolution and object detection labels by annotating the acquired data from the plurality of camera and lidar sensors and the beam steering radar;
    training a radar neural network with the super-resolution and object detection labels, wherein the radar neural network is coupled to the beam steering radar; and
    regenerating the object detection labels at a Kalman filter coupled to the radar neural network.

18. The method of claim 17, further comprising increasing a resolution of radar data for human annotators using the super-resolution labels in a super-resolution network.

19. The method of claim 17, wherein training the radar neural network is based on information from trained camera and lidar neural networks.

20. The method of claim 17, wherein regenerating of the object detection labels at the Kalman filter includes matching candidate objects detected in the acquired data with objects that have been detected in previous time windows.

* * * * *